Patented Apr. 4, 1939

2,152,960

UNITED STATES PATENT OFFICE 2,152,960

PROCESS FOR THE MANUFACTURE OF CYCLOHEXANOLS

Max Hartmann, Riehen, near Basel, Hellmut Ensslin, Basel, and Leandro Panizzon, Riehen, near Basel, Switzerland, assignors to the firm Society of Chemical Industry in Basle, Basel, Switzerland No Drawing. Application May 20, 1936, Serial No. 80,906. In Switzerland May 28, 1935

8 Claims. (Cl. 260—563)

Little is known concerning the preparation of hydroaromatic amino-alcohols or derivatives thereof. Of the six theoretically possible aminocyclohexanols only one of the two stereo-isomeric forms of ortho-aminocyclohexanol has been prepared in a pure state, namely by the addition of ammonia to cyclohexenoxide (Brunel, Comptes Rendus, vol. 137 (1903), page 198) or from cyclohexene and iodo-oxycyanogen (Birckenbach and Linhard, Berichte der Deutschen Chem. Ges., vol. 64, (1931), page 1076). By catalytic reduction of ortho- and para-nitrophenol or the corresponding aminophenols in alcoholic solution Senderens and Aboulenc (Comptes Rendus, vol. 177 (1923), page 158) believed that they obtained ortho- and para-aminocyclohexanols; however, the melting points given by these authors for the bases (47° C. and 64°–65° C.) and for the hydrochlorides (75° C. and 90° C.) rendered it probable that the products were really N-alkylated compounds. Repetition of their experiments has shown that in fact no uniform compounds can be obtained in this manner. Also Komatsu and Amatatsu (Memoirs of the College of Science, vol. 13 (1930), page 332) could obtain by the reduction of para-nitrophenol or para-aminophenol with hydrogen in the presence of nickel and in the absence of a solvent only a mixture of bases from which no para-aminocyclohexanol could be isolated.

According to this invention uniform hydroaromatic amino-alcohols and derivatives thereof can be obtained by causing hydrogen to act at temperatures of about 150–180° C. and under pressure on an acylaminophenol or a derivative thereof in the presence of a metal of the group consisting of nickel, cobalt and mixtures thereof and an organic solvent and if desired subjecting the reaction products to saponification, if required after previously separating them into their stereo-isomers. The nitrogen of the amino-group in the acylaminophenol may carry any desired acyl radical, for example, an acetyl, propionyl or benzoyl radical. Besides the amino-group the hydroxyl group may also be acylated. Furthermore the acylaminophenols may contain still further substituents, for example, alkyl-, aralkyl or aryl-groups, in the nucleus, at the oxygen atom or at the nitrogen atom. Besides mononuclear aminophenols there may also be used polynuclear analogues thereof. Suitable solvents are alcohols and hydroaromatic hydrocarbons such as decahydronaphthalene, cyclohexane, methylcyclohexane and so on.

There is a tendency towards the formation of both stereoisomeric forms of the hydroaromatic acylamino-alcohols or derivatives thereof, which are obtained by the process of the invention in quantitative yield; these stereoisomeric forms usually differ in their solubilities sufficiently to enable them to be easily separated from one another by fractional crystallization. The isomers of higher melting point and lower solubility are believed to be the trans-compounds and the isomers of lower melting point and higher solubility the cis-compounds.

By saponifying the hydroaromatic acylaminoalcohols or derivatives thereof according to the customary methods, for example, by treatment with acids such as hydrochloric acid or sulfuric acid, or with alkalies, there are obtained the corresponding hydroaromatic amino-alcohols or derivatives thereof, which are generally very stable compounds which crystallize well and have a strongly basic character. They are useful products for the manufacture of medicaments and textile assistants.

The following examples illustrate the invention, the parts being by weight:—

Example 1

60.4 parts of para-acetaminophenol are mixed with 140 parts of absolute alcohol and reduced by means of hydrogen in presence of a nickel catalyst at a temperature of 180° C. in a closed vessel. The reaction solution is evaporated to dryness and the residue, consisting of a mixture of the two stereoisomeric para-acetaminocyclohexanols formed in quantitative yield, is fractionally recrystallized from 240 parts of acetone. There is first obtained the trans-para-acetaminocyclohexanol in the form of beautifully formed crystals which melt at 164° C.; from the mother liquor there can be recovered the cis-isomer which, after repeated recrystallization, melts at 135° C. The two acetyl compounds are saponified by boiling for several hours with hydrochloric acid (1:2), the solutions are cooled and after addition of caustic soda solution are extracted with chloroform. After expelling the solvent from the extracts there are obtained the para-aminocyclohexanols which can easily be recrystallized from chloroform and ether. They are fairly readily soluble in water. The trans-isomer melts at 110–111° C. and the cis-isomer at 78–80° C.; the melting point of a mixture of the two lies at 60° C. The corresponding hydrochlorides melt at 223–225° C. and 195° C. respectively, the mixed melting point being 180° C.

In an analogous manner there are obtained from para-stearyl-aminophenol the para-stearyl-aminocyclohexanols, from which the aminocyclohexanols described above are obtained by saponification.

Example 2

100 parts of ortho-acetaminophenol are reduced with hydrogen in the presence of nickel and in the presence of 300 parts of decahydronaphthalene at a temperature of 180° C. in a closed vessel. The mixture of cis- and trans-ortho-acetaminocyclohexanol thus obtained is sparingly soluble in cold decahydronaphthalene. It is recrystallized from acetone or ethyl acetate, whereby the trans-isomer of melting point 146° C. first separates. The more readily soluble cis-isomer melts at 124–125° C. The corresponding bases are obtained by saponification with hydrochloric acid (1:2). The trans-isomer, recrystallized from chloroform and ether, melts at 72°–73° C. and the cis-isomer, recrystallized from ligroin, melts at 65° C.; a mixture of the two melts at 51° C. The hydrochloride of the trans-isomer melts at 185° C., that of the cis-isomer at 175° C. and a mixture of the hydrochlorides at 145°–150° C. They may be recrystallized from alcohol.

By the analogous reduction of an acylamino-dihydroxy- or trihydroxy-benzene, such as for instance ortho-acetaminobrenzcatechine, there are obtained the corresponding hydrogenated compounds.

Example 3

75 parts of meta-acetaminophenol are reduced in alcoholic solution by means of hydrogen in presence of a nickel-cobalt catalyst at 160° C. in a closed vessel. The reduction occurs very rapidly and leads to one only of the two expected stereoisomeric forms of the meta-acetaminocyclohexanol. When recrystallized from acetone the product melts at 120° C. By saponification with sulfuric acid of 10 per cent. strength there is obtained meta-aminocyclohexanol of melting 73° C. Its hydrochloride melts at 174°.

Example 4

70 parts of para-benzaminophenol are reduced in alcoholic solution by means of hydrogen in presence of nickel at 150°–170° C. in a closed vessel. There is thus obtained the trans-form of para-hexahydrobenzaminocyclohexanol which, when recrystallized from alcohol, melts at 224° C. It is sparingly soluble in water and yields on saponification the trans-para-aminocyclohexanol of melting point 110° C. described in Example 1.

In a similar manner, ortho-hexahydrobenzaminocyclohexanol of melting point 206° C. is obtained by reduction of ortho-benzaminophenol in presence of decahydronaphthalene.

Example 5

90 parts of para-acetylphenetidine are reduced in alcoholic solution by means of hydrogen in presence of nickel at 170°–180° C. in a closed vessel. The product of the hydrogenation is readily soluble in water. It constitutes a mixture of the two stereoisomeric forms of para-acetylaminocyclohexanol ethyl ether which can be separated with the aid of ether into the more sparingly soluble trans-isomer of melting point 155° C. and the more freely soluble cis-isomer of melting point about 55° C. By saponification of the acyl compounds there are obtained the corresponding bases, of which the trans-isomer boils at 60°–62° C. under a pressure of 3 mm. and the cis-isomer boils at 50°–60° C. under a pressure of 5 mm.

In like manner there can be made the meta-acetaminocyclohexanol ethyl ether of melting points 98° C. and the free amino-compound of boiling point 74°–76° C. under a pressure of 3 mm.

In a similar manner ortho-acetylphenetidine can be converted by reduction in solution in methylcyclohexanol into the ortho-acetaminocyclohexanol ethyl ether of boiling point 130° C. under 3 mm. pressure and its saponification product of boiling point 55°–60° C. under 3 mm. pressure.

The acylaminobenzenes substituted with two or three alkoxy groups produce the corresponding hydrogenated compounds by analogous reduction.

Example 6

80 parts of para-acetylanisidine are reduced in alcoholic solution by means of hydrogen in the presence of nickel at a temperature of 170°–180° C. in a closed vessel. There is thus obtained the para-acetylaminocyclohexanol methyl ether which is soluble in water and melts at 67° C. From this product there can be obtained the free base which boils at 59° C. under a pressure of 5 mm.

In like manner there can be made the ortho-acetylaminocyclohexanol methyl ether which boils at 140°–148° C. under a pressure of 5 mm.; the corresponding free base boils at 52°–56° C. under a pressure of 4 mm.

Example 7

An alcoholic solution of 382 parts of para-acetylaminophenol allyl ether is shaken with nickel and hydrogen at first in the cold, whereby the allyl group is reduced, and then at 180° C. in a closed vessel, whereby the nucleus undergoes hydrogenation. The hydrogenation product is separated into the two stereoisomeric forms with the aid of water. The trans-para-acetylaminocyclohexanol propyl ether which is insoluble in water boils at 147°–148° C. under a pressure of 0.01 mm. and melts at about 120° C.; the cis-isomer which is soluble in water boils at 125°–130° C. under a pressure of 0.03 mm. From these compounds there are obtained by saponification the corresponding free bases; the trans-base boils at 114°–116° C. and the cis-base at 80°–82° C., in each case under a pressure of 4 mm.

Example 8

165 parts of para-N-methylacetylaminophenol (melting point 238° C., prepared by acetylation of para-N-methylaminophenol) are reduced in alcoholic solution by means of hydrogen in presence of nickel at 170°–180° C. in a closed vessel. The hydrogenation product can be separated with the aid of ethyl acetate into the two stereoisomeric para-N-methylacetylaminocyclohexanols, namely a trans-isomer of melting point 98° C. and a cis-isomer of melting point 72° C. By saponification there are obtained the corresponding para-N-methylaminocyclohexanols of which the trans-isomer melts at 116° C. and the cis-isomer boils at 94°–100° C. under a pressure of 3 mm.

When starting from other N-alkylacylaminophenols, such as for example N-ethylacetylaminophenol, there are obtained the corresponding N-alkylaminocyclohexanols.

What we claim is:

1. A process for the manufacture of hydrogenated compounds, consisting in nuclearly hydrogenating the conjugated double bonds of aromatic compounds of the formula

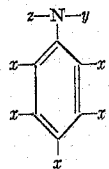

wherein one to three $x$'s stand for radicals selected from the group consisting of hydroxy and alkoxy, the other $x$'s stand for hydrogen, $y$ stands for acyl and $z$ stands for a radical selected from the group consisting of hydrogen and alkyl, the reaction being effected at temperatures of about 150 to about 180° C. in a closed vessel under pressure and in the presence of a metal of the group consisting of nickel, cobalt and mixtures thereof and an organic solvent.

2. A process for the manufacture of hydrogenated compounds, consisting in nuclearly hydrogenating the conjugated double bonds of aromatic compounds of the formula

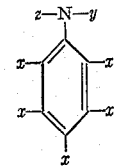

wherein one to three $x$'s stand for radicals selected from the group consisting of hydroxy and alkoxy, the other $x$'s stand for hydrogen, $y$ stands for acyl and $z$ stands for a radical selected from the group consisting of hydrogen and alkyl, the reaction being effected at temperatures of about 150 to about 180° C. in a closed vessel under pressure and in the presence of a metal of the group consisting of nickel, cobalt and mixtures thereof and an organic solvent, and subjecting the products of the reaction to saponification.

3. A process for the manufacture of hydrogenated compounds, consisting in nuclearly hydrogenating the conjugated double bonds of aromatic compounds of the formula

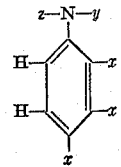

wherein one $x$ stands for a radical selected from the group consisting of hydroxy and alkoxy, the other $x$'s stand for hydrogen, $y$ stands for acyl and $z$ stands for a radical selected from the group consisting of hydrogen and alkyl, the reaction being effected at temperatures of about 150 to about 180° C. in a closed vessel under pressure and in the presence of a metal of the group consisting of nickel, cobalt and mixtures thereof and an organic solvent.

4. A process for the manufacture of hydrogenated compounds, consisting in nuclearly hydrogenating the conjugated double bonds of aromatic compounds of the formula

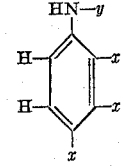

wherein one $x$ stands for a radical selected from the group consisting of hydroxy and alkoxy, the other $x$'s stand for hydrogen and $y$ stands for acyl, the reaction being effected at temperatures of about 150 to about 180° C. in a closed vessel under pressure and in the presence of a metal of the group consisting of nickel, cobalt and mixtures thereof and an organic solvent.

5. A process for the manufacture of hydrogenated compounds, consisting in nuclearly hydrogenating the conjugated double bonds of aromatic compounds of the formula

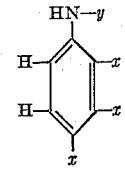

wherein one $x$ stands for a radical selected from the group consisting of hydroxy and alkoxy, the other $x$'s stand for hydrogen and $y$ stands for acetyl, the reaction being effected at temperatures of about 150 to about 180° C. in a closed vessel under pressure and in the presence of a metal of the group consisting of nickel, cobalt and mixtures thereof and an organic solvent, and subjecting the products of the reaction to saponification.

6. A process for the manufacture of hydrogenated compounds, consisting in nuclearly hydrogenating the conjugated double bonds of aromatic compounds of the formula

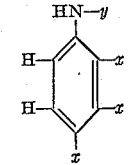

wherein one $x$ stands for a radical selected from the group consisting of hydroxy and alkoxy, the other $x$'s stand for hydrogen and $y$ stands for a high fatty acid radical, the reaction being effected at temperatures of about 150 to about 180° C. in a closed vessel under pressure and in the presence of a metal of the group consisting of nickel, cobalt and mixtures thereof and an organic solvent.

7. A process for the manufacture of hydrogenated compounds, consisting in nuclearly hydrogenating the conjugated double bonds of aromatic compounds of the formula

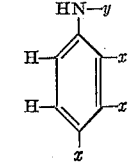

wherein one $x$ stands for a radical selected from the group consisting of hydroxy and alkoxy, the other $x$'s stand for hydrogen and $y$ stands for acetyl, the reaction being effected at temperatures of about 150 to about 180° C. in a closed vessel under pressure and in the presence of a metal of the group consisting of nickel, cobalt and mixtures thereof and an organic solvent, and subjecting the products of the reaction to saponification after previously separating them into their stereoisomeric forms.

8. A process for the manufacture of hydrogenated compounds, consisting in nuclearly hydrogenating the conjugated double bonds of aromatic compounds of the formula

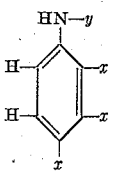

wherein one $x$ stands for a radical selected from the group consisting of hydroxy and alkoxy, the other $x$'s stand for hydrogen and $y$ stands for acetyl, the reaction being effected at temperatures of about 150 to about 180° C. in a closed vessel under pressure and in the presence of a metal of the group consisting of nickel, cobalt and mixtures thereof and an organic solvent, and subjecting the products of the reaction to saponification after previously separating them into their stereoisomeric forms by fractional crystallization.

MAX HARTMANN.
HELLMUT ENSSLIN.
LEANDRO PANIZZON.